June 28, 1949.　　　M. WATTER　　　2,474,560
FLEXIBLE GUN MOUNT FOR AIRCRAFT
Filed Oct. 18, 1930　　　　　　　　2 Sheets-Sheet 1
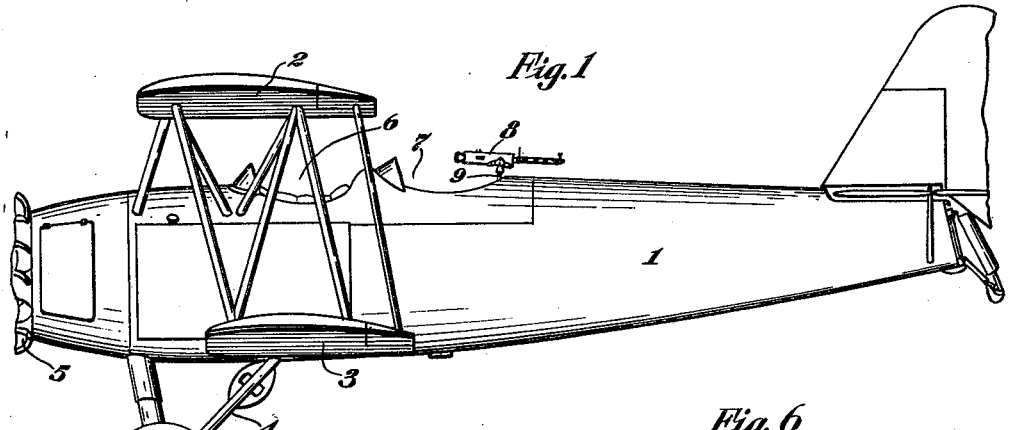
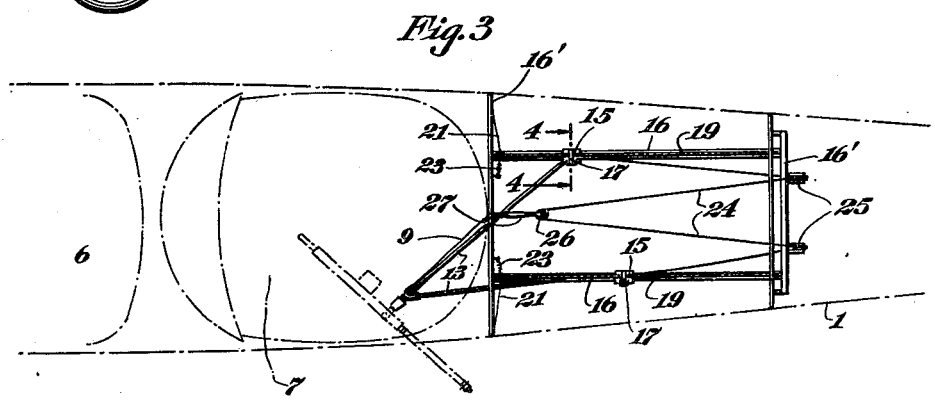
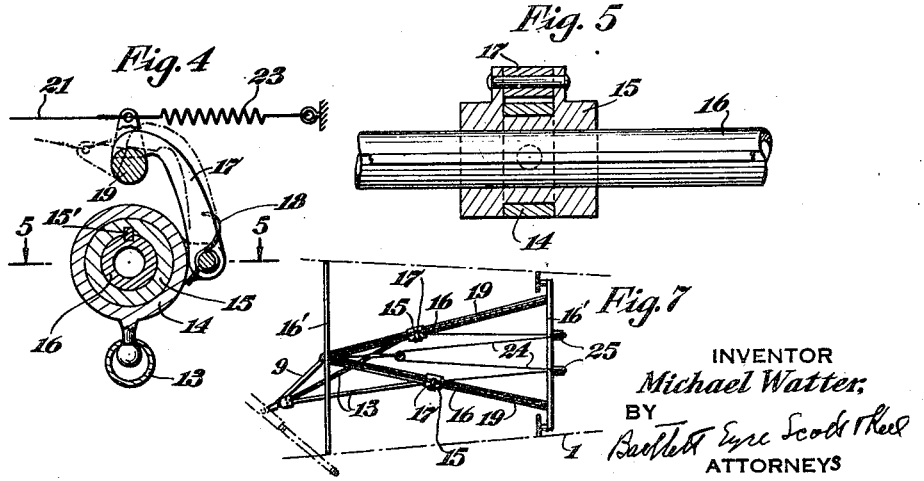
INVENTOR
*Michael Watter*
BY
ATTORNEYS June 28, 1949. M. WATTER 2,474,560
FLEXIBLE GUN MOUNT FOR AIRCRAFT
Filed Oct. 18, 1930 2 Sheets-Sheet 2

INVENTOR
Michael Watter,
BY
ATTORNEYS

Patented June 28, 1949

2,474,560

UNITED STATES PATENT OFFICE 2,474,560

FLEXIBLE GUN MOUNT FOR AIRCRAFT

Michael Watter, Hartford, Conn., assignor to United Aircraft Manufacturing Corporation, a corporation of Delaware Application October 18, 1930, Serial No. 489,537

20 Claims. (Cl. 89—37.5)

My invention relates to flexible gun mounts and particularly for machine gun mounts on aircraft.

One object of the invention is a gun mount which can be satisfactorily and practically employed for machine guns of various types regardless of construction and weight. A further object of the invention is a universal gun mount which is readily adjustable by the gunner to any desired firing position with a minimum of effort on his part, the weight of the gun and other forces being effectively balanced in any position to which the gun may be moved. A still further object of the invention is a gun mount of the above indicated character which permits the major part of the structure to be built within the stream lines of the fuselage and out of the wind stream, in contrast with the common types of mount in general use wherein the greater portion of the gun mount structure is situated on the top of the fuselage or exposed to the wind stream. A further object of the invention is a gun mount structure characterized by the major part thereof being contained within the fuselage at a point adjacent the cockpit, the latter thereby being for the most part unobstructed by and free from the gun mount. A still further object of the invention is a gun mount of simple construction and operation and which offers a minimum of air resistance.

The aforementioned and other objects and advantages may readily be seen by reference to the accompanying drawings in which:

Fig. 1 is a side elevation of an airplane showing one position of the gun in relation to the gunner's cockpit, Fig. 3 is a plan view of the mount, Fig. 4 is a section through 4—4 of Fig. 3, Fig. 5 is a section through 5—5 of Fig. 4.

Fig. 6 is a section of the locking member, and

Fig. 7 is a diagrammatic sketch of another embodiment of tthe mount.

Figure 2:
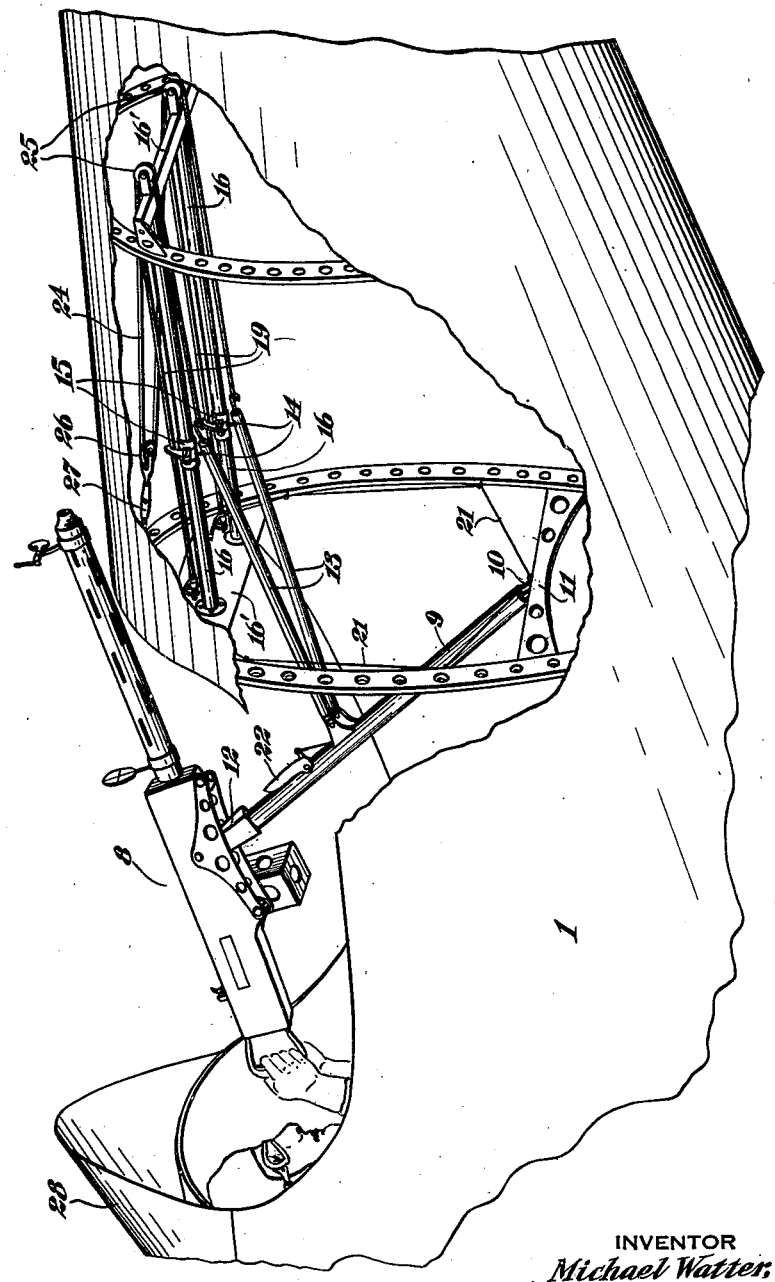
Fig. 2 is a perspective showing a fragment of the fuselage with a section removed to show the gun mount.

I have shown my invention as embodied in an airplane having a fuselage 1, biplanes 2 and 3, carriage 4, power plant 5 and cockpits 6 and 7. In the particular embodiment shown, a machine gun 8 is mounted on a gun standard 9, to be operated from the rear cockpit. The gun standard 9, which in this instance is a straight rod, is secured by a universal connection 10 to the transverse bulkhead 11 at its mid point and adjacent to the cockpit 7. The gun standard 9 may assume any angular position about the universal pivot 10 and extends slightly above the rim of the cockpit and is provided at the top with a suitable swivel or trunnion mount 12, as required for the type of gun carried. The standard 9 is adjustable to various angular positions and held in the desired positions by retaining arms 13 which diverge from the standard and are pivotally connected to swiveling members 14. Swiveling members 14 are free to rotate about collars 15 (Fig. 4). The collars 15 are free to move longitudinally along guide members 16 which are splined to receive feathers 15' which are integral with collars 15. The guide members are rigidly secured to the transverse members 16' of the fuselage. The collars 15 carry locking latches 17 which are pivotally connected but are maintained in contact with locking members 19 by spring 18. The locking members 19 are journalled on the transverse fuselage members 16' and may be turned by a cable 21 which extends to the hand grip 22 on the gun standard, which when pressed overcomes the tension of holding springs 23 turning members 19 and lifting the locking latches 17 out of engagement with the locking notches 20 of members 19 (Fig. 6), permitting the standard to be moved to the position desired. In the particular embodiment of the gun mount shown herein a resilient or elastic cable 24 is provided which interconnects the retaining arms 13 and is roved over sheaves 25 and through pulley 26, the latter being secured to the fuselage by a turnbuckle 27. The purpose of this cable mechanism is to assist the gunner in moving the mount around in the cockpit and to assist in returning the slides or collars 15 to the rearmost position.

As illustrated in Fig. 1 the gun and a small section of the gun standard are the only parts of the combination projecting above the fuselage in any position, the major part of the mechanism being enclosed within the stream lines of the fuselage. The wind pressure is, therefore, reduced to a minimum even when the gun is exposed to the air stream, and in certain positions of the standard the gun is almost entirely out of the wind stream, as for example when it is drawn forwardly as indicated in Fig. 2 to a position partly within the cockpit and behind the wind shield 28, this being due to the particular mounting of the gun upon the standard 9 pivotally connected at a point rearward of the cockpit. The rearward pull of the gun as the standard moves from the vertical is counteracted by the flexible cable 24, the tension increasing as the angle increases. If it is desired to fire over the side as illustrated in Fig. 3, the standard 9 is moved laterally bringing the gun over into a position to fire in any direction over the side, one or both of the sliding collars 15 to which the retaining arms are attached moving along the guides depending upon the character of the movement given the standard. The flexibility of the mount is therefore unlimited as the gun may readily be moved in any direction as a gunner would naturally shift it to fire upon a target.

When it is desired to move the gun to any desired position, hand grip 22 is pressed overcoming the tension of spring 23 and simultaneously members 19 are turned, lifting the locking latches out of engagement, whereupon the gun may be shifted as desired until grip 22 is released and the holding spring 23 returns the locking members to alinement and spring 18 forces the locking latches into engagement.

In Fig. 7 I have shown a diagrammatic view of a slightly modified form of mount wherein the guide members 16 instead of being parallel are shown inclined to each other, in the particular embodiment shown forming a V.

It will be noted that in both of these embodiments regardless of the position of the gun standard, the retaining arms 13 and a line drawn between the point of their connection to the swiveling members 14 will always form within closely approximate limits an isosceles triangle.

Reference is made to Watter et al., application Serial No. 574,690, filed November 13, 1931, which relates to a gun mount generally similar to that set forth herein.

I claim:

1. A flexible gun mount for aircraft comprising a gun standard mounted for universal movements, a pair of guide members having one end of each disposed adjacent the standard, a pair of retaining arms pivotally connected each at one end with said standard and slidably connected at their other ends with said guide members and means for locking the said other ends of the retaining arms at any desired positions along said guide members.

2. A flexible gun mount for aircraft comprising a gun standard mounted upon an aircraft frame for universal movements, a pair of guide members disposed at one end adjacent said standard, a pair of retaining arms pivotally connected with said standard at one end and slidably connected at their other ends with said guide members, yielding and biasing means between the aircraft frame and said retaining arms and means for locking the said other ends of retaining arms in any desired positions along said guide members.

3. In a flexible gun mount of the character set forth in claim 2 wherein the yielding means comprises a resilient cable interconnecting the retaining arms and means maintaining said cable taut during movement of said cable relatively to the movement of the retaining arms.

4. In a flexible gun mount of the character set forth in claim 1 wherein the standard is pivotally mounted at its lower end and the retaining arms are pivotally connected with the standard at a point below the level of the guide members.

5. In a flexible gun mount of the character set forth in claim 1 wherein the standard is pivotally mounted at its lower end, the guide members are spaced from each other and in substantial parallelism and the retaining arms are pivotally connected with the standard at a point below the level of the guide members in all positions.

6. In aircraft a stream lined body having a cockpit therein and a gun mount comprising a standard pivotally mounted at its lower end to one side of the cockpit for universal movements, a pair of guide members contained within the stream lines of the main body adjacent the cockpit, a pair of retaining arms pivotally connected with said standard at one end and slidably connected with said guide members at their other ends and yielding and biasing means also disposed within the stream lines of the body and connected between the body and said retaining arms.

7. A flexible gun mount of the character set forth in claim 1 including a releasing device carried by the standard in a position to be gripped by the gunner for releasing the locking means when the gunner grips the standard for adjustment.

8. A flexible gun mount comprising a standard mounted at its lower end for universal movements, a pair of guide members and means adjustably interconnecting the guide members and the standard whereby the three points of connection with the standard and the two guide members form substantially an isosceles triangle in all positions.

9. In a flexible gun mount of the character set forth in claim 1 wherein the means connecting the retaining arms with the guide members includes members splined to the guide members for longitudinal movement thereon and other members adjustably connected with the splined members.

10. In a flexible gun mount of the character set forth in claim 1 wherein the means connecting the retaining arms with the guide members includes members splined to the guide members for longitudinal movement thereon and other members adjustably connected with the splined members, and locking means comprising a latch carried by the splined member and a rotatable keeper carried by the frame.

11. In a flexible gun mount of the type described in claim 1, means for connecting the retaining arms and guide members, comprising a feathered collar movable longitudinally along said guide members, a swiveling sleeve carried by said collar and a locking latch supported by the collar.

12. In a flexible gun mount of the type described in claim 1, the locking means comprising notched members, means for rotating said members out of locking position an means for returning said members to locking position.

13. In a flexible gun mount of the type described in claim 1, means for locking the said retaining arms against movement along the guide members, comprising a notched locking bar, locking latches and means for controlling same from the gun standard.

14. In a flexible gun mount of the character set forth in claim 2 wherein the yielding and biasing means includes a cable looped around a pulley attached to the aircraft frame with its ends connected to the ends of the retaining arms and passing around sheaves at the remote ends of the guide members.

15. In combination with aircraft, a flexible gun mount comprising a gun standard having a universal pivotal mounting for universal movements, and means of variable effective length independent of the pivotal mounting connecting the standard to a fixed part of the aircraft for locking the standard in desired position, and means carried by the upper end of said standard only for securing a gun thereon.

16. A flexible gun mount for aircraft comprising a gun standard mounted for universal movements, guide members disposed adjacent the standard, retaining arms connected at one end with the standard and at the other end with said guide members and means for locking the retaining arms in desired position.

17. In aircraft having a gunner's compartment, means for supporting a gun comprising a standard pivotally mounted at its lower end and projecting into the compartment, retaining arms of fixed length connected to the standard and to the aircraft, said arms adapted to move relative to said aircraft and means for locking said arms in desired position.

18. In combination with an aircraft, a flexible gun mount comprising a gun standard mounted for universal movement, means for holding said gun mount in desired position comprising retaining arms pivotally connected at one end with said standard, a sliding connection between said arms and the aircraft and means for locking said arms in desired position.

19. Flexible gun mount for aircraft, comprising gun supporting means mounted for universal movement and means to lock said supporting means to hold the gun in desired position, said last mentioned means including members adapted to form a trihedron having variable base angles in all gun positions, all the aforesaid means being disposed within the aircraft and out of the air stream.

20. A flexible gun mount as described in claim 1, wherein the means for locking the retaining arms with the guide members includes members splined to the guide members for longitudinal movement thereon, and other members adjustably connected with the splined members, said arms being simultaneously adjustable in opposite directions along the respective guide members.

MICHAEL WATTER.

REFERENCES CITED

The following references are of record in the file of this patent:

UNITED STATES PATENTS

| Number | Name | Date |
|---|---|---|
| 1,364,525 | Scarff | Jan. 4, 1921 |
| 1,561,992 | Marazzi | Nov. 17, 1925 |
| 1,592,490 | Inglis | July 13, 1926 |
| 1,874,422 | Beisel | Aug. 30, 1932 |
| 1,902,107 | Trimbach | Mar. 21, 1933 |

FOREIGN PATENTS

| Number | Country | Date |
|---|---|---|
| 9,958 | Great Britain | 1913 |
| 15,208 | Great Britain | 1915 |
| 72,131 | Switzerland | Dec. 3, 1915 |
| 128,244 | Great Britain | June 26, 1919 |
| 129,319 | Great Britain | July 17, 1919 |
| 290,345 | Great Britain | May 7, 1928 |
| 299,940 | Great Britain | Nov. 8, 1928 |
| 310,398 | Great Britain | Apr. 25, 1929 |
| 332,398 | Great Britain | July 24, 1930 |
| 492,425 | France | Mar. 19, 1919 |